United States Patent
Kober et al.

(10) Patent No.: US 6,511,095 B1
(45) Date of Patent: Jan. 28, 2003

(54) ROLLOVER PROTECTION SYSTEM FOR MOTOR VEHICLES

(75) Inventors: Peer-Olaf Kober, Sindelfingen (DE); Juergen Schrader, Weil im Schönuch (DE); Carsten Unruh, Filderstadt-Bernhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/746,069

(22) Filed: Dec. 26, 2000

(30) Foreign Application Priority Data

Dec. 24, 1999 (DE) .......................... 199 62 950

(51) Int. Cl.7 ............................................. B60R 21/13
(52) U.S. Cl. .................. 280/756; 280/753; 297/216.12
(58) Field of Search ................. 280/751, 753, 280/756; 297/216.12, 410, 391

(56) References Cited

U.S. PATENT DOCUMENTS

| | | | | |
|---|---|---|---|---|
| 3,397,911 A | * | 8/1968 | Brosius | 297/216.12 |
| 5,056,816 A | | 10/1991 | Lütze et al. | 280/751 |
| 5,110,185 A | | 5/1992 | Schmutz et al. | 297/410 |
| 5,205,585 A | | 4/1993 | Reuber et al. | 280/753 |
| 5,288,129 A | * | 2/1994 | Nemoto | 297/410 |
| 5,458,396 A | | 10/1995 | Rost | 297/216.12 |
| 5,626,361 A | * | 5/1997 | Heiner | 280/756 |
| 5,655,791 A | * | 8/1997 | Nowack et al. | 280/756 |
| 5,927,803 A | | 7/1999 | Hehl et al. | 297/216.12 |
| 6,296,278 B1 | * | 10/2001 | Zupancic et al. | 280/756 |

FOREIGN PATENT DOCUMENTS

| | | | |
|---|---|---|---|
| DE | 38 22 461 | | 1/1990 |
| DE | 39 22 509 | | 1/1991 |
| DE | 39 27 265 | | 2/1991 |
| DE | 39 30 171 | | 3/1991 |
| DE | 100 26 978 C1 | * | 10/2001 |
| EP | 0 407 741 | | 1/1991 |
| EP | 0 439 565 | | 8/1991 |
| EP | 0 456 646 | | 11/1991 |
| EP | 0 850 808 | | 7/1998 |
| EP | 0 933 262 A1 | * | 12/1998 |
| EP | 0 976 621 A1 | * | 7/1999 |

* cited by examiner

*Primary Examiner*—Paul N. Dickson
*Assistant Examiner*—David R. Dunn
(74) *Attorney, Agent, or Firm*—Crowell & Moring LLP

(57) ABSTRACT

A rollover protection system for motor vehicles, especially for convertibles, is described, with a head restraint assigned to a vehicle seat and a rollover member displaceable by an at least approximately translational movement from a lowered inoperative position upwards into a support position, the head restraint being intended to have a recess open at the bottom. The rollover member, at least in a position of non-use and in the event of overturning, is accommodated with its upper section in the recess of the head restraint.

20 Claims, 6 Drawing Sheets

ROLLOVER PROTECTION SYSTEM FOR MOTOR VEHICLES

BACKGROUND AND SUMMARY OF THE INVENTION

This application claims the priority of German Patent Document 199 62 950.1, filed in Germany, Dec. 24, 1999, the disclosure of which is expressly incorporated by reference herein.

The invention relates to a rollover protection system for motor vehicles of the type having a head restraint assigned to a vehicle seat and a rollover member displaceable from a lowered inoperative position to an upper support position.

In the event of an accident in which the vehicle overturns, there is, especially on open-top motor vehicles such as convertibles, off-road vehicles etc., no protective, bracing roof structure as there is in enclosed vehicles. Rollover protection systems are therefore intended to help protect the occupants of open-top motor vehicles against injury in the event of overturning.

On some known, existing open-top vehicles the windscreen frame and a fixed bar, which extends over the vehicle behind the (rear) seats, serve as rollover protection. Since such a fixed rollover bar may detract from the overall visual appearance of the vehicle there are, for classic convertibles without these fixed rollover bars, lowerable bars in the rear compartment of the vehicle. Should the vehicle overturn, this rollover bar is automatically swivelled about an axis from an inoperative position into its operative position.

Another rollover protection system is described in German Patent Document DE 39 27 265 C2 (corresponding U.S. Pat. No. 5,205,585). This relates to a rollover protection system in which a rollover bar can be shifted into its ultimate deployed position by means of flexible pre-stressing devices in response to a signal triggered in the event of overturning, the movement of the rollover bar occurring substantially in one plane that runs perpendicular to the longitudinal axis of the vehicle. At least one padded cushion serving as head restraint is also provided on the said rollover bar. The rollover bar can also be shifted into the deployed or lowered ultimate position by an additional drive, by means of which the height of the head restraint can be correspondingly adjusted to suit the respective occupant in the associated seats.

A rollover protection system in which a rollover bar combined with a head restraint is assigned to each vehicle seat, the rollover bar behind the associated seat being braced on the vehicle floor behind the associated seat and its legs being height-adjustable in guides, and the U-shaped frame serving to fix the consequently vertically moveable head-restraint padded cushion, is described in German Patent Document DE 38 22 461 C2.

In this known rollover protection system, the fact that the entire rollover bar always has to be moved when adjusting the head restraint and the means of clamping also have to be released and clamped each time has proved to be a disadvantage. This means that the means of clamping must be designed using very high-grade and hence costly materials. Furthermore, adjusting the entire rollover bar in order to adjust the head restraint makes a very expensive drive mechanism necessary.

German Patent Document DE 39 22 509 C2 (corresponding U.S. Pat. No. 5,056,816) discloses a rollover bar, which spans the width of the passenger compartment of the vehicle and the legs of which are displaceable in guide tubes fixed to the vehicle. At the same time the rollover bar is arranged behind the vehicle seat backrests. Such a construction has proved disadvantageous, since the rollover bar must be specifically accommodated in the vehicle and braced in relation thereto. Furthermore, such a rollover bar takes up a considerable separate amount of space in the passenger compartment of the motor vehicle EP 0 407 741 A1 (corresponding U.S. Pat. No. 5,056,816) and EP 0 439 565 B1 (corresponding U.S. Pat. No. 5,205,585) furthermore disclose the fitting of an additional padded cushion, which serves as head restraint, to the top section of the rollover bar. Even these rollover bars, however, have the disadvantage that in order to adjust the head restraint to suit the respective occupants the entire rollover bar always has to moved, thereby necessitating the use of costly materials and an expensive drive mechanism, as already described above.

In addition, rollover protection systems are disclosed in German Patent Document DE 39 30 171 C2 (corresponding U.S. Pat. No. 5,110,185) and European Patent Document EP 0 456 646 B1 (corresponding U.S. Pat. No. 5,458,396). In these, the rollover bar is arranged in the seat backrest and in the inoperative position runs with its upper outer contour flush with the adjoining contour of the head restraint. In both cases the rollover protection member is braced in relation to the vehicle body by way of the supporting structure of the seat backrest in the event of overturning. On the one hand this saves overall space, since not only the head restraint but also the rollover bar is incorporated into the seat backrest and does not have to be separately accommodated in the vehicle and braced in relation to the latter. On the other hand, however, the seat itself on the adjusting rails, the adjusting joints and motors and the support structure entail a considerable cost.

A further rollover protection system for an automobile is disclosed in European Patent Document EP 0 850 808 B1 (corresponding U.S. Pat. No. 5,927,803). In this case a rollover bar is designed with a head restraint assigned to a vehicle seat and is displaceable by an at least approximately translational movement from a lowered inoperative position upwards into a support position. In this case the rollover bar in the inoperative position is incorporated with its upper section into the head restraint of the vehicle seat. The head restraint furthermore has a receiver, in which, in the inoperative position, the upper section of the rollover bar is accommodated. If the rollover bar is now to deploy to its maximum possible bracing height, a part of the head restraint folds upwards in the manner of a cover, and in the event of overturning the rollover bar can deploy through this opening.

The fact that the head restraint remains in its original position and that the occupants of the corresponding seats may thereby be at risk from the free-standing rollover bar in the head impact area, however, has proved something of a problem in this case. Moreover, a thin padded cushion on the rollover bar only affords the occupants inadequate protection against an impact with the rollover bar.

In the event of an accident occupants may also possibly strike the deployed rollover bar on the opposite side of the vehicle, thereby sustaining injuries.

Proceeding from this known prior art, an object of the invention is to provide a rollover protection system of the type mentioned at the outset, which affords the occupants better protection in the event of overturning but which is less costly to produce.

This object is met by providing a rollover protection system for motor vehicles, especially for convertibles, with a head restraint assigned to a vehicle seat and a rollover member displaceable by an at least approximately translational movement from a lowered inoperative position upwards into a support position, the head restraint having a recess open at the bottom, wherein the rollover member is accommodated with its upper section in a recess of the head restraint in both the inoperative position and the support position.

In the rollover protection system according to the invention the head restraint has a recess open at the bottom and is deployed to a maximum bracing height in the event of overturning. The rollover member is surrounded by the head restraint at all times, due to the fact that the head restraint now moves into the support position with the rollover member. As a result this affords the occupants of the vehicle the maximum possible protection to prevent them striking parts of their body against the support structure of the rollover member, so that head impact injuries, in particular, can be prevented or considerably reduced. The rollover protection system according to the invention is of particular advantage, for example, in the event of a secondary impact with the rollover member already deployed or in a situation in which the rollover member deploys whilst the head of at least one of the occupants is situated above the rollover member.

According to an especially preferred embodiment of the invention a supporting structure is incorporated into the head restraint recess. In this case the supporting structure may either be built into the head restraint, or the head restraint may also simply be flanged on to the supporting structure.

At the same time the shape of the structure is such that it has a shape corresponding to that of the rollover member. Therefore if the rollover member takes the form of a U-shaped bar, for example, the supporting structure has a shape corresponding to that of the bar.

This structure is in any case brought to maximum bracing height by the deploying rollover member in the event of overturning, the head restraint carrying it along and fixing it in this position by positively interlocking.

The positive interlock fixing preferably occurs in such a way that the rollover member is deformed in a certain way, thereby adjusting to the shape of the support structure.

The supporting structure of the head restraint therefore serves as the actual outwardly bracing part, which is itself, however, in turn braced by the rollover member.

Further advantages and embodiments of the invention emerge from the further claims and the preferred exemplary embodiments described in principle below with reference to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
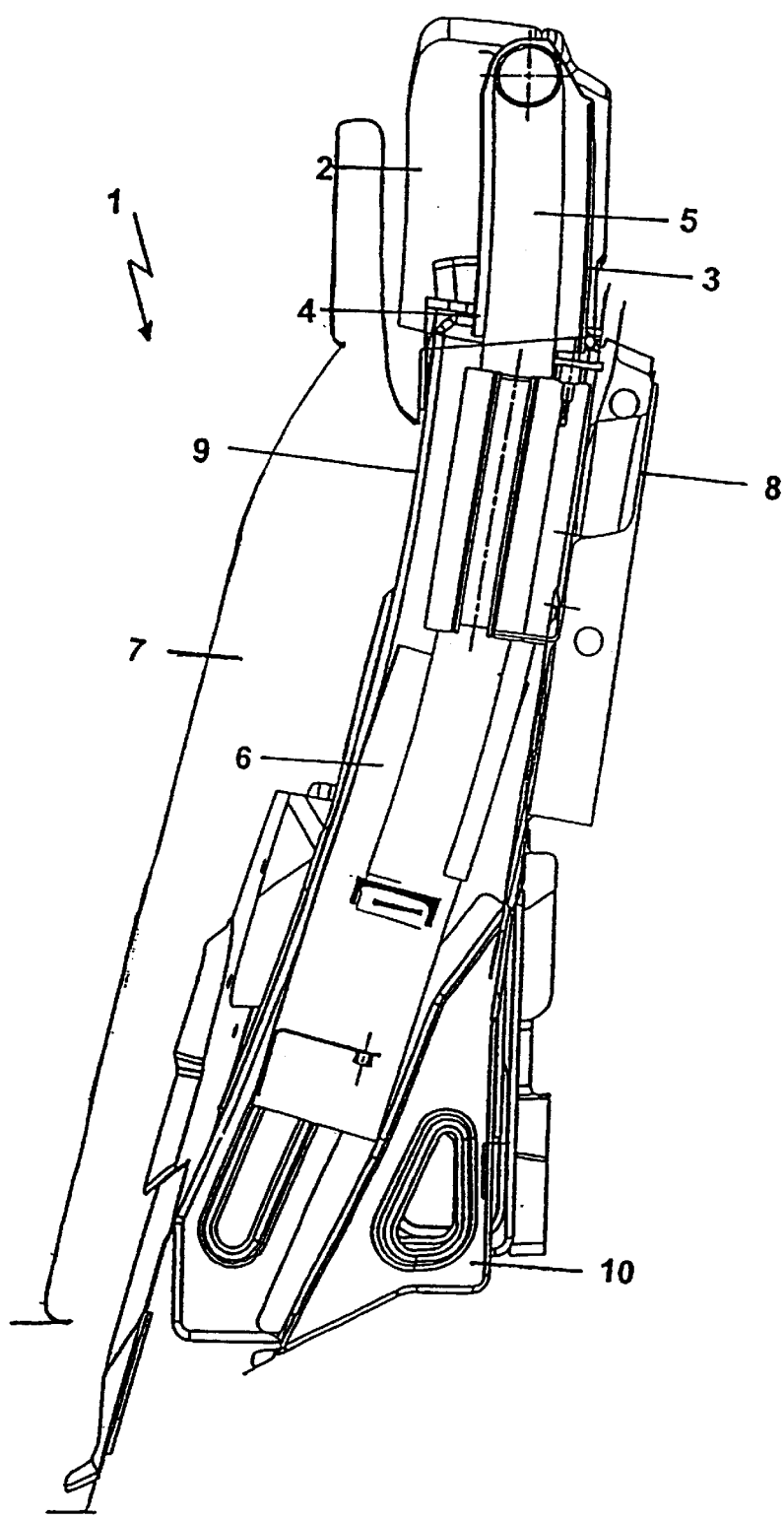
FIG. 1 shows a side view of a preferred embodiment of the rollover protection system according to the invention in a retracted position, i.e. position of non-use.
Figure 2:
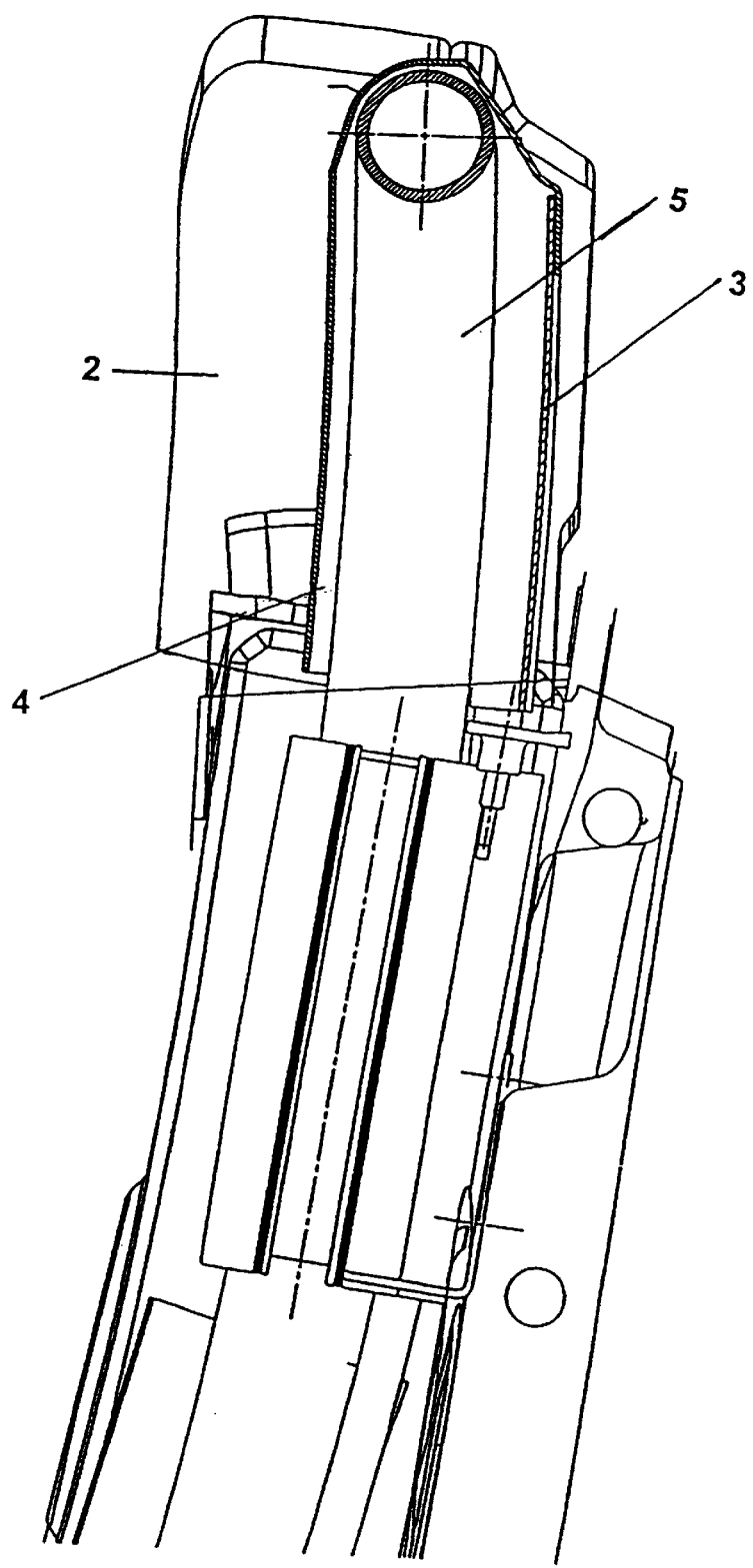
FIG. 2 shows an enlargement of the upper section of the rollover protection system shown in FIG. 1, the representation of the seat upholstery having been omitted for reasons of clarity.

FIG. 1 shows a rollover protection system 1 according to the invention for motor vehicles, especially for convertibles, in a sectional view from the side. This rollover protection system is in each case assigned to a vehicle seat. FIG. 2 depicts an enlargement of the upper section of the rollover protection system 1 that is of particular interest in this case, without the seat upholstery 7 visible in FIG. 1.

According to the preferred embodiment shown a substantially U-shaped rollover bar serves as rollover member 5. The said rollover bar 5 is carried and braced in a cassette 6, which for its part is in turn itself braced on the vehicle body, such as the vehicle body construction or a body rear panel, and fixed thereto, for example by bolting. In order to stabilize this construction of the rollover protection system 1, reinforcing plates 10 are provided, which can be seen, for example, from FIG. 1.

According to this exemplary embodiment shown, the rollover bar 5 is therefore not braced on and fixed to the structure of a backrest of a vehicle seat, such as a rear carcass wall 8 or a front carcass wall 9 of the vehicle seat, for example. It would nevertheless be feasible, in another embodiment of the invention, for the rollover bar 5 to be braced by way of the structure of the backrest of the vehicle seat. Although this would result in a somewhat more costly construction it would save overall space in the vehicle.

A head restraint 2 assigned to the respective vehicle seat is provided at the upper end of the backrest. The head restraint 2 may be adjusted in height to suit the respective occupant by means of devices familiar to the person skilled in the art and in common use. As can be seen from FIG. 3 and FIG. 4, this is done independently of the rollover bar 5. Thus, according to the exemplary embodiment shown, for adjustment to the respective occupant the head restraint may be adjusted to suit the respective occupant simply by pulling it out or pushing it in, the head restraint being guided along one or more guide bars 11. The head restraint 2 is fixed by catches, which engage in the guide bars 11 of the head restraint 2.

FIG. 1 and FIG. 2 show the rollover protection system 1 according to the invention in which the head restraint 2 is in a retracted position, that is in a so-called position of non-use. As depicted here, the rollover bar 5, too, is in its inoperative position.

As can be seen from FIG. 1 and FIG. 2, the head restraint 2 has a recess 4 open at the bottom. According to the preferred embodiment shown, a supporting structure 3, which is here designed as a shell of high-strength material, preferably sheet steel or the like, is moreover incorporated into the recess 4.

Figure 3:
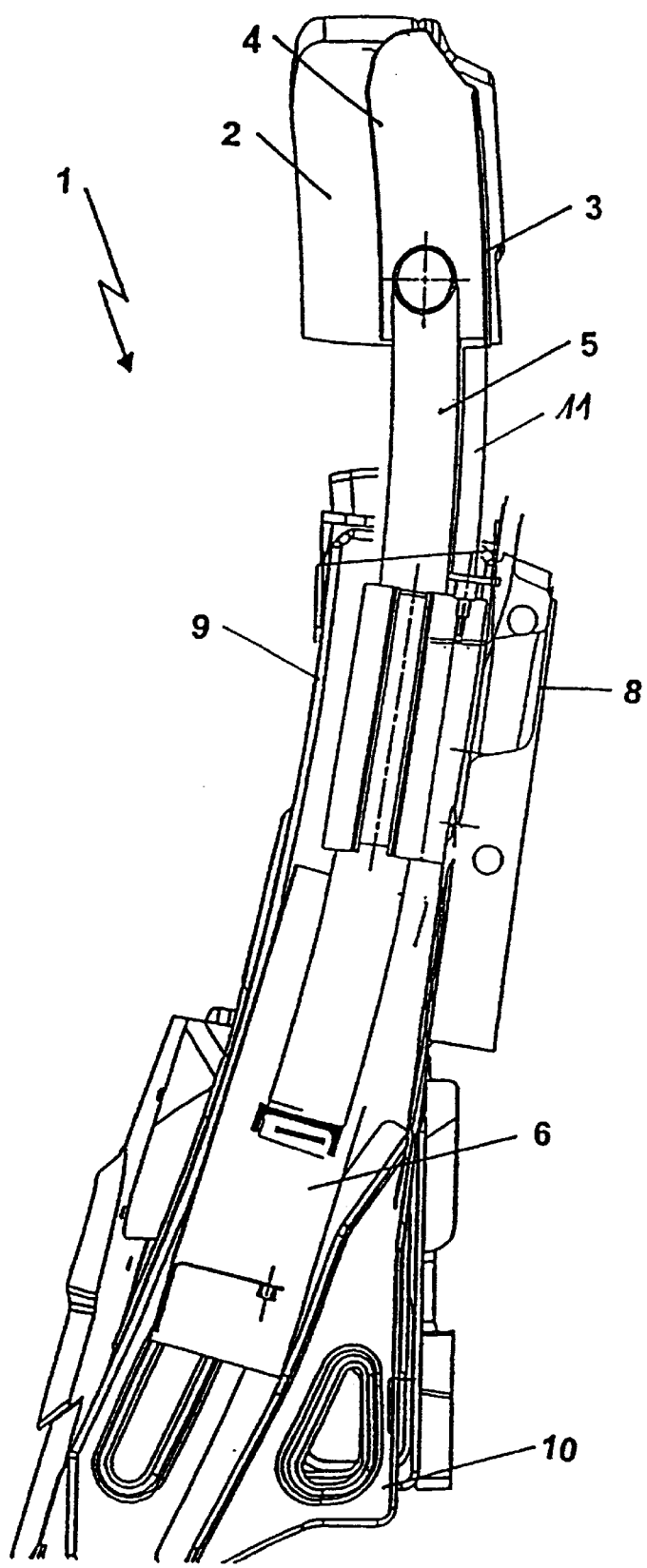
FIG. 3 shows a side view of the rollover protection system shown in FIG. 1 in a head restraint use position.
Figure 4:
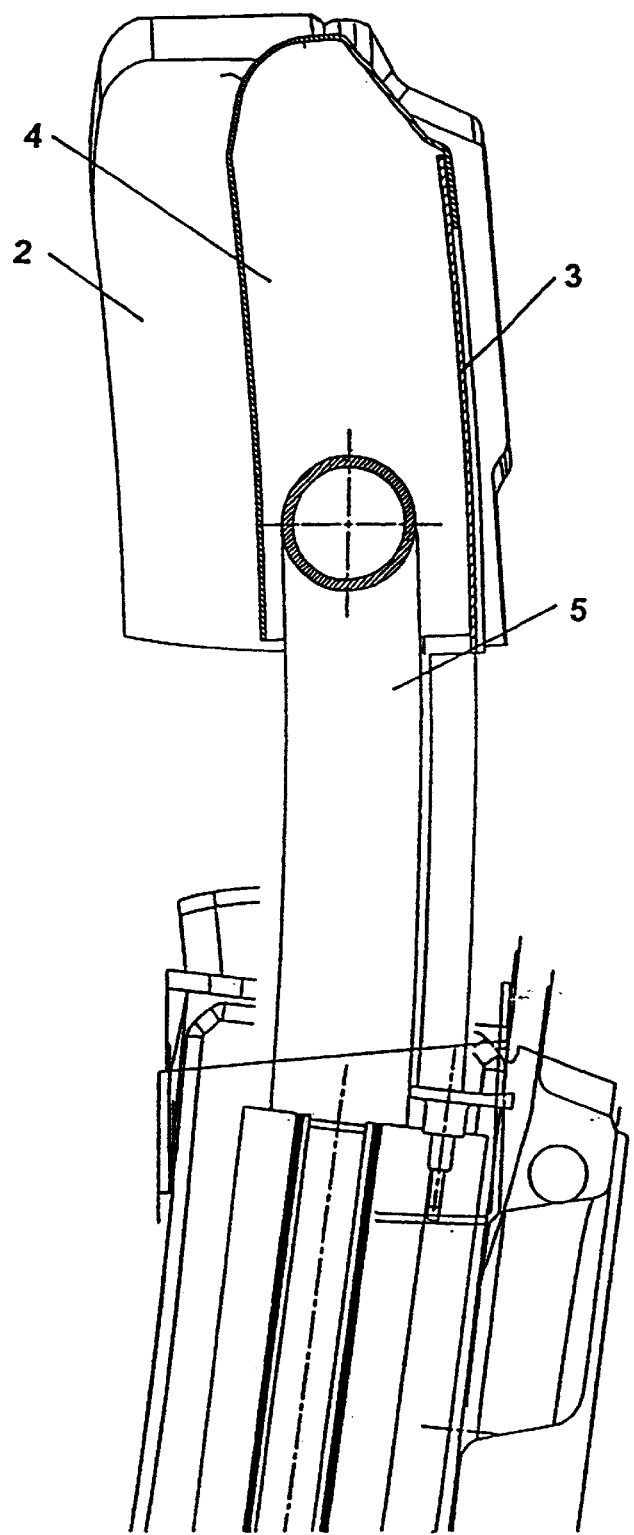
FIG. 4 shows an enlargement of the upper section of the rollover protection system shown in FIG. 3.

FIG. 3 and FIG. 4 on the other hand show a side view of the rollover protection system 1 according to the invention, the seat upholstery 7 likewise not being represented. FIG. 4 shows an enlarged section taken from the upper area of the rollover protection system 1 shown in FIG. 3 that is of particular interest here.

In these FIGS. 3 and 4 the rollover protection system 1 is now shown with the head restraint in a position of use. That is to say the head restraint 2 is deployed into a position adjusted to the size of the occupant of the vehicle seat. As will be seen from the Figures, the head restraint 2 has been moved upwards by an appropriate drive, in this case by pulling it out manually or by a known drive concept. The rollover bar 5 is not moved in the event of such a head restraint movement and remains in its lowered inoperative position. This means that the rollover bar 5 need not always be completely contained in the recess 4 when adjusting the head restraint 2. According to the embodiment shown the latter would be the case only where the head restraint 2 is fully lowered and is in its position of non-use, as can be seen from FIG. 1 and FIG. 2.

Figure 5:
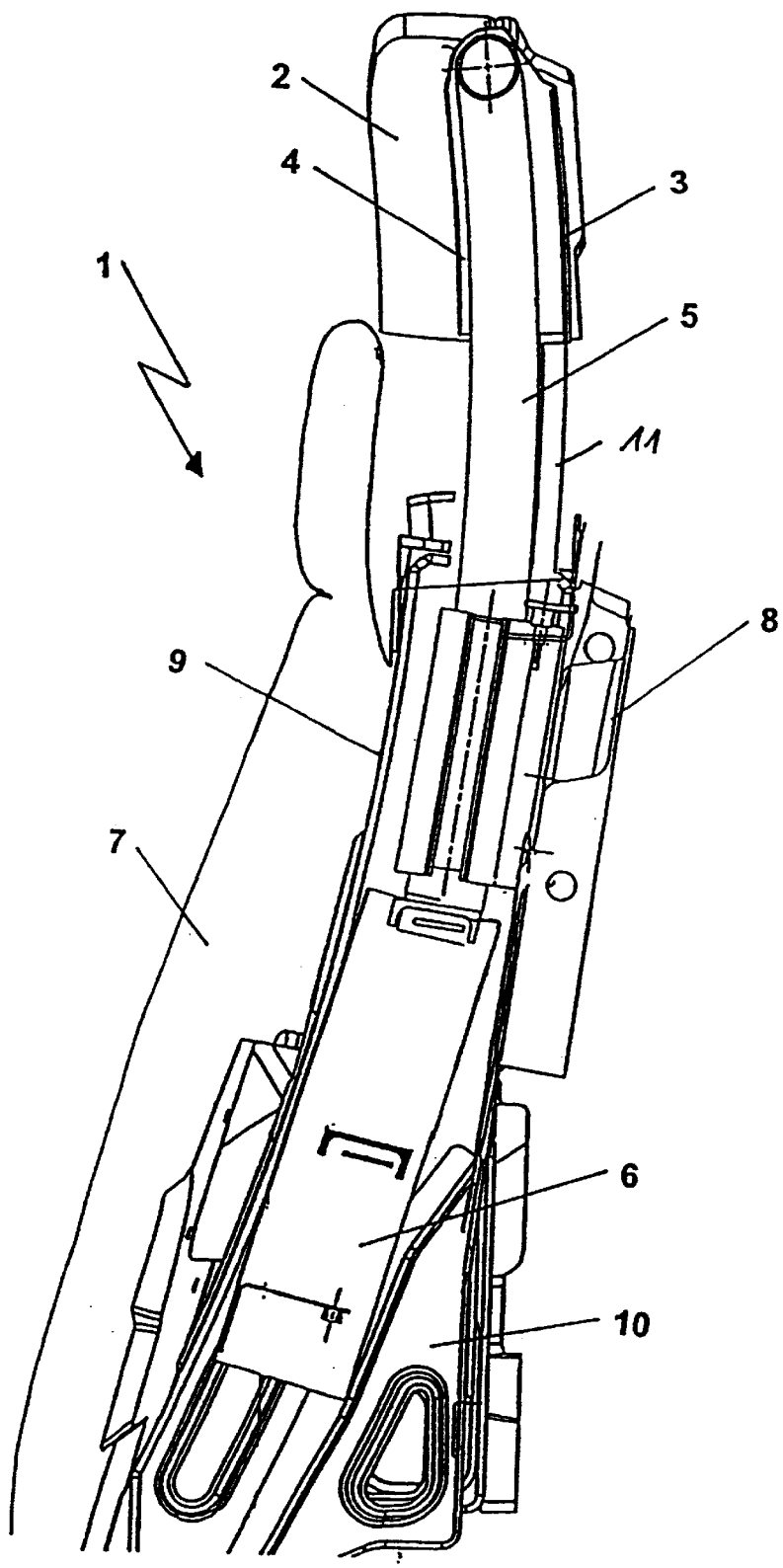
FIG. 5 shows a side view of the rollover protection system shown in FIG. 1 in an overturn position.
Figure 6:
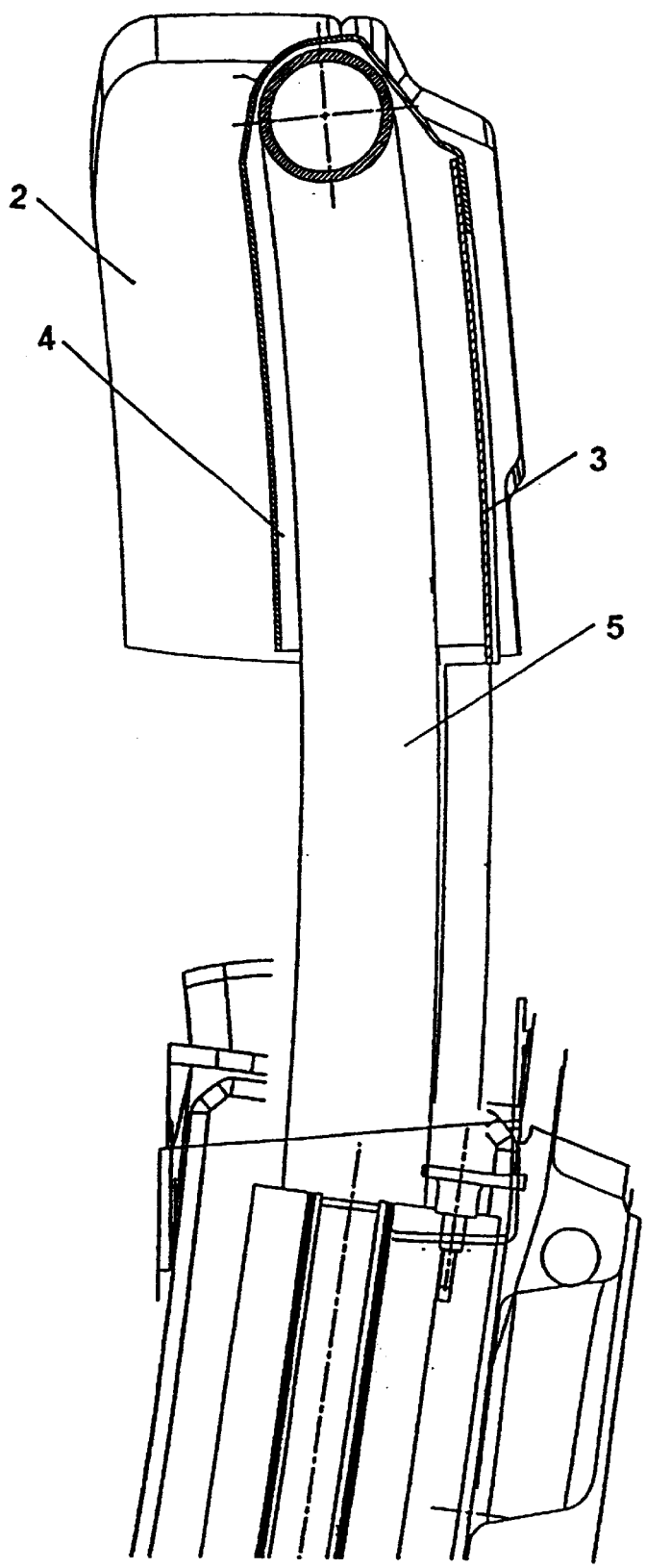
FIG. 6 shows an enlargement of the upper section of the rollover protection system shown in FIG. 5.

As now represented in FIG. 5 and FIG. 6, of which FIG. 6 shows an enlarged section of the upper area of FIG. 5, the rollover bar 5, in the event of a crash or overturning, is shifted by an at least approximately translational movement from a lowered inoperative position upwards into a support position. This is generally performed in such a way that the rollover bar 5 is moved upwards by springs, by energizing an electromechanical actuator, which releases the springs. In the bracing position the rollover bar 5 is then automatically locked by means familiar to the person skilled in the art, such as catches as in the case here.

This displacement of the rollover bar 5 is preferably controlled by way of a sensor. Since overturning is possible in any direction, overturning detection must function in all directions.

The various sensors pick up the necessary variables, from which a control module calculates an imminent vehicle impact or possible overturning.

At the same time a sensor system may be designed in such a way that two criteria are used for detecting the risk of overturning and for triggering the rollover protection system.

For the first triggering criterion each sensor registers the acceleration values in the longitudinal and transverse direction of the vehicle. A microcomputer compares the resulting acceleration with a pre-programmed triggering threshold. If this threshold is exceeded, the system is activated.

For the second triggering condition a clinometer switch evaluates the inclination of the vehicle. As soon as a limit is exceeded here also, the system is activated.

Both of these triggering criteria thereby coexist independently of one another.

The rollover bar 5 is preferably deployed by suitable drive elements, such as pre-tensioned springs, for example. However, motors or even gas-generating chemical reactions may also be used for this purpose.

As already mentioned above, according to the embodiment shown a supporting structure 3 in the form of a shell is incorporated in the recess 4 of the head restraint 2. In the event of a crash or overturning the said load-bearing structure 3 is brought to maximum bracing height by the deploying rollover bar 5, as can be seen in FIG. 5 and FIG. 6. In so doing the rollover bar carries the head restraint 2 with it and fixes the latter in this position in a positive interlocking manner. This prevents the head restraint 2 becoming detached from the rollover bar 5 in the event of overturning.

The supporting structure 3 of the head restraint 2 therefore serves as the actual deflecting part, which is in turn braced by the rollover bar 5.

According to the embodiment shown the rollover protection system 1 for motor vehicles is reversible. This means that preferably only those parts are used which can also be reset after triggering of the rollover bar 5. This has the advantage that in the event of a malfunction of the system no parts of the rollover protection system 1 have to exchanged or refitted, but that the rollover bar 5 can easily be retracted again.

The fact that in the event of overturning the head restraint 2 is brought to the maximum bracing height by the deploying rollover member 5 has proved particularly advantageous in the rollover protection system 1 according to the invention. At the same time the rollover member 5 is at all times surrounded by the head restraint, and the head restraint 2 is always brought to the maximum deployable position after triggering of the rollover member 5. This results in optimum protection to prevent the vehicle occupants striking parts of their bodies against the structure of the rollover member 5.

As can be seen from FIG. 5, the seat upholstery 7 in the upper area is designed to come up to at least the bottom edge of the head restraint 2, when the rollover bar 5 is in its bracing position. This has proved particularly advantageous since the risk of injury can thereby be further reduced, especially in a secondary impact with the rollover member 5 already deployed.

In order to prevent the head restraint 2 becoming detached when the vehicle overturns, it has proved beneficial if the head restraint 2 is fixed to the rollover member, at least whilst overturning. According to the embodiment shown and as already described above, this may be achieved by means of the supporting structure 3 provided in the recess 4 of the head restraint 2.

The rollover protection system 1 according to the invention is preferably assigned to a rear seat of a vehicle. Thus it is feasible for the windscreen frame to serve as the overturn fixture protecting the occupants in the front area of the motor vehicle in the event of overturning, and for the rollover protection system 1 according to the invention to serve this function in the rear area of the vehicle. The idea of the invention might however be embodied additionally or exclusively on a front seat of the motor vehicle.

In addition, it is also feasible to assign the rollover protection system according to the invention to each vehicle seat, a sensor system serving to detect which seats are occupied, so that in the event of a crash or overturning only the rollover protection systems assigned to the occupied seats are triggered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A rollover protection system for a motor vehicle comprising:
    a head restraint assigned to a vehicle seat, and
    a rollover member displaceable by an at least approximately translational movement from a lowered inoperative position upwards into a support position, the head restraint having a recess open at a bottom of the head restraint,
    wherein an upper section of the rollover member is disposed in the recess in both the inoperative position and the support position, and
    wherein said upper section is movable within the recess as the rollover member is displaced from the inoperative position to the support position.

2. The rollover protection system for a motor vehicle according to claim 1, wherein a supporting structure for accommodating the rollover member is incorporated in the recess.

3. The rollover protection system for a motor vehicle according to claim 1, wherein the rollover member is mounted to be reversibly moveable between the inoperative and support positions.

4. The rollover protection system for a motor vehicle according to claim 1, wherein the head restraint is fixed by the rollover member in the support position at least in the event of overturning.

5. The rollover protection system for a motor vehicle according to claim 1, wherein the head restraint and rollover member are assigned to a rear seat of a vehicle.

6. The rollover protection system for a motor vehicle according to claim 1, wherein the rollover member is braced on a section of body construction of the motor vehicle.

7. The rollover protection system for a motor vehicle according to claim 1, wherein the rollover member is braced on a structure of a seat backrest.

8. The rollover protection system for a motor vehicle according to claim 1, wherein the rollover member is designed as an at least approximately U-shaped rollover bar.

9. The rollover protection system for a motor vehicle according to claim 1, wherein the rollover member is stored in a cassette.

10. The rollover protection system for a motor vehicle according to claim 9, wherein said cassette is disposed below the head restraint.

11. The rollover protection system for a motor vehicle according to claim 2, wherein the rollover member is mounted to be reversibly moveable between the inoperative and support positions.

12. The rollover protection system for a motor vehicle according to claim 11, wherein the head restraint is fixed by the rollover member in the support position at least in the event of overturning.

13. The rollover protection system for a motor vehicle according to claim 2, wherein the head restraint and rollover member are assigned to a rear seat of a vehicle.

14. The rollover protection system for a motor vehicle according to claim 12, wherein the head restraint and rollover member are assigned to a rear seat of a vehicle.

15. The rollover protection system for a motor vehicle according to claim 2, wherein the rollover member is designed as an at least approximately U-shaped rollover bar.

16. The rollover protection system for a motor vehicle according to claim 10, wherein the rollover member is designed as an at least approximately U-shaped rollover bar.

17. The rollover protection system for a motor vehicle according to claim 1, comprising sensors for sensing vehicle rollover conditions and operable to initiate control signals to move the rollover member from the inoperative position to the support position.

18. The rollover protection system for a motor vehicle according to claim 1, wherein said vehicle is a convertible.

19. A convertible vehicle assembly comprising:

a vehicle seat, a head restraint assigned to the vehicle seat, and a rollover member selectively moveable between a lowered inoperative position to a raised support position, wherein said rollover member has an upper section which is disposed in a recess of the head restraint in both the inoperative position and the support position, and wherein the upper section moves in said recess as vertical adjustment of the rollover member from the inoperative position to the support position occurs.

20. An assembly according to claim 19, wherein said rollover member and head restraint are configured such that the rollover member lifts the head restraint when the rollover member moves to the support position.

* * * * *